United States Patent [19]

Kaugars

[11] 3,879,542

[45] Apr. 22, 1975

[54] ANTI-ARTHROPODAL FORMULATION AND METHOD

[75] Inventor: Girts Kaugars, Kalamazoo, Mich.

[73] Assignee: The Upjohn Company, Kalamazoo, Mich.

[22] Filed: Oct. 16, 1972

[21] Appl. No.: 297,887

[52] U.S. Cl. ............... 424/327; 252/316; 260/546; 260/558; 260/559; 260/566; 260/569; 424/46; 424/168; 424/357
[51] Int. Cl. ............................................ A01n 9/20
[58] Field of Search .................................. 424/327

[56] References Cited
UNITED STATES PATENTS
3,721,742   3/1973   Folz .................................. 424/327

OTHER PUBLICATIONS

Gibson, Journal of Chemical Society, 1962, pp. 2270–2272.

Primary Examiner—Albert T. Meyers
Assistant Examiner—Dale R. Ore
Attorney, Agent, or Firm—Roman Saliwanchik; Carl A. Randles, Jr.

[57] ABSTRACT

Certain new benzoyl chloride (fluoroalkylphenyl)-hydrazones have been found to be active against arthropod pests and worms. The characterizing fluoroalkyl group on the phenylhydrazone ring can be associated with other substituent atoms and groups. The benzoyl ring can also be substituted. Representative substituent atoms and groups include the halogen atoms, lower-alkyl groups, lower-alkoxy groups, and a nitro group. The fluoroalkyl group is more meaningfully designated an "$\alpha$-$F_n$alkyl" group because fluorine atom substitution on the $\alpha$-carbon appears to be advantageous.

The new compounds can be prepared by reacting a benzoic acid 2-($\alpha$-$F_n$alkylphenyl)hydrazide with phosphorus pentachloride to obtain a benzoyl chloride [(dichlorophosphinyl-$\alpha$-$F_n$alkyl)phenyl]hydrazone that is reacted with phenol to produce the desired benzoyl chloride ($\alpha$-$F_n$alkylphenyl)hydrazones. The compounds having chlorine on the phenylhydrazone ring can be prepared by direct halogenation of benzaldehyde ($\alpha$-$F_n$alkylphenyl)hydrazones or a benzoyl chloride ($\alpha$-$F_n$alkylphenyl)hydrazone. Methods of anti-arthropodal use and novel formulations adapted for biological use of the new compounds are also described.

22 Claims, No Drawings

ANTI-ARTHROPODAL FORMULATION AND METHOD

SUMMARY OF THE INVENTION

This invention pertains to new chemical compounds, a new method for controlling (combating) arthropod pests, and new formulations for effectuating pest control. The invention is more particularly directed to new benzoyl chloride ($\alpha$-$F_n$alkylphenyl)hydrazones, new benzoic acid 2-($\alpha$-$F_n$alkylphenyl)hydrazide starting compounds, new benzaldehyde ($\alpha$-$F_n$alkylphenyl)hydrazone starting compounds, a new method for controlling arthropod pests with the new benzoyl chloride ($\alpha$-$F_n$alkylphenyl)hydrazones, and new formulations containing the same for pest control.

The new benzoyl chloride ($\alpha$-$F_n$alkylphenyl)hydrazones of this invention have the general structural formula:

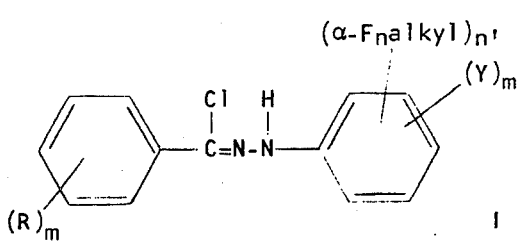

wherein "$\alpha$-$F_n$alkyl" is alkyl of from 1 to 3 carbon atoms, inclusive, having 1 to 4 fluorine atom substituents, at least one of which is on the $\alpha$-carbon, $n$ being therefore an integer from 1 to 4, inclusive; R and Y are halogen (i.e., bromine, chlorine, fluorine, and iodine), lower-alkyl of from 1 to 4 carbon atoms, inclusive, lower-alkoxy of from 1 to 4 carbon atoms, inclusive, and nitro; $m$ is an integer 0 through 5, inclusive, $m'$ is an integer 0 to 2, inclusive, $n'$ is an integer 1 or 2, the sum of $m + m' + n'$ being not more than 6, the sum of $n' + m'$ being not more than 3, the sum of carbon atoms in the alkyl substituents being not more than 15, and there being no more than one nitro group in the molecule.

DETAILED DESCRIPTION OF THE INVENTION

The new benzoyl chloride ($\alpha$-$F_n$alkylphenyl)hydrazones of this invention are readily prepared by reacting a selected new benzoic acid 2-($\alpha$-$F_n$alkylphenyl)hydrazide starting compound with phosphorus pentachloride, reacting the resulting, corresponding new benzoyl chloride [(dichlorophosphinyl-$\alpha$-$F_n$alkyl)phenyl]hydrazone with phenol, and recovering the desired new benzoyl chloride ($\alpha$-$F_n$alkylphenyl)hydrazone. The process can be represented as follows:

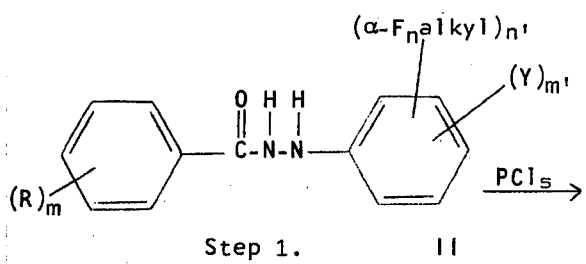

Step 1.

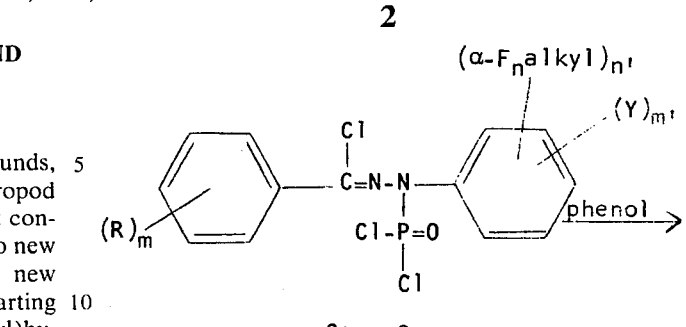

Step 2.

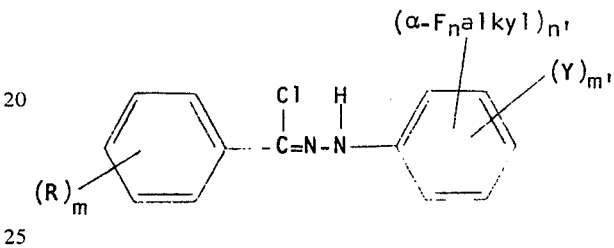

Step 1 of the foregoing process proceeds when a new benzoic acid 2-($\alpha$-$F_n$alkylphenyl)hydrazide starting compound (compounds of Formula II, above) and the phosphorus pentachloride are mixed in the presence of a reaction medium at a temperature in the range of about 10° C. up to about the boiling point of the reaction medium. Higher and lower temperatures can be used, however. The reaction rate will be decreased at low temperatures, and a pressure vessel would be needed to effect reaction temperatures above the boiling point at atmospheric pressure. In accordance with a preferred embodiment, the initial reaction mixture is heated.

Appropriate reaction media include, for example, the chlorinated hydrocarbon solvents, aliphatic or aromatic hydrocarbon solvents, and ethers. Respresentative specific ones are carbon tetrachloride (preferred), methylene chloride, chloroform, 1,2-dichloroethylene, benzene, toluene, technical hexane diethyl ether, and dioxane.

The process can be practiced without isolating the new benzoyl chloride [(dichlorophosphinyl-$\alpha$-$F_n$alkyl)phenyl]hydrazone intermediate when three equivalents or more of phenol are added to the initial reaction mixture after it has been cooled to about 0° to 25° C. The phenol reacts with the new benzoyl chloride [(dichlorophosphinyl-$\alpha$-$F_n$alkyl)phenyl]hydrazone intermediate to produce triphenyl phosphate, and the desired new benzoyl chloride ($\alpha$-$F_n$alkylphenyl)hydrazone is then recovered and purified by conventional methods. The solvent medium is removed by evaporation, and the desired product is recovered, e.g., by filtration from the residual triphenyl phosphate or by chromatographic techniques. The compound is purified by recrystallization.

The new benzoic acid 2-($\alpha$-$F_n$alkylphenyl)hydrazide starting compounds of Formula II can be readily prepared by known methods. According to one method a benzoyl chloride reacted with a phenylhydrazine is described by J. Hausknecht, Chem. Ber. 22, p. 324 (1889), and E. Bamberger and W. Pemsel, Chem. Ber.

36, p. 359 (1903). Another method is described in U.S. Pat. No. 2,912,461, issued Nov. 10, 1959, that utilizes a benzoate ester and a phenylhydrazine. Still another method described by W. Autenrieth and G. Thomae, Chem. Ber. 57, p. 423 (1924) reacts a benzoic acid anhydride with a phenylhydrazine to produce the corresponding benzoic acid 2-phenylhydrazide. ($\alpha$-F$_n$Alkylphenyl)hydrazine may be substituted for the phenylhydrazine in all these methods to produce the corresponding new benzoic acid 2-($\alpha$-F$_n$alkylphenyl)hydrazide. Example 1 hereinafter illustrates a conventional method for making benzoic acid (m-trifluoromethylphenyl)hydrazide for use as a starting compound. Examples 2 and 3 hereinafter illustrate a conventional method for making benzaldehyde (m-trifluoromethylphenyl)-hydrazone and benzaldehyde (2-chloro-5-trifluoromethylphenyl)hydrazone for use as starting compounds.

The new anti-arthropodal benzoyl chloride ($\alpha$-F$_n$alkylphenyl)hydrazones of this invention (compounds according to Formula I) can also be prepared by chlorinating a benzaldehyde ($\alpha$-F$_n$alkylphenyl)hydrazones (compounds of Formula III).

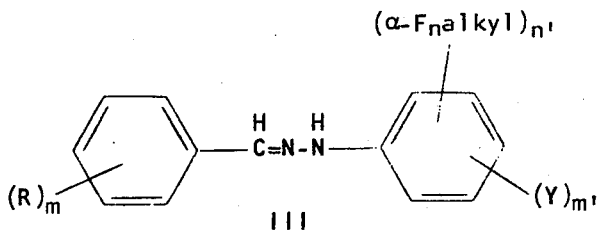

III

Chlorination of a benzaldehyde phenylhydrazone can be accomplished as described by J. E. Humphries, H. Humble and R. Evans, J. Chem. Soc. 127, p. 1304 (1925). But this chlorination is of limited usefulness when the starting benzaldehyde ($\alpha$-F$_n$alkylphenyl)hydrazone has unsubstituted active sites that will yield to chlorination at positions on the phenylhydrazone portion. The additional chlorination that can occur is disadvantageous when an unsubstituted compound is actually desired. Direct chlorination of a benzaldehyde ($\alpha$-F$_n$alkylphenyl)-hydrazone is an efficient way of producing benzoyl chloride ($\alpha$-F$_n$alkylchlorophenyl)hydrazones.

Still another method described by L. A. Jones, C. K. Hancock, and R. B. Seligman, J. Org. Chem. 26, p. 228 (1961) can be used. The described method utilized $\alpha,\alpha,\alpha$-trichlorotoluene and 2,4-dinitrophenylhydrazine to produce benzoyl chloride 2,4-dinitrophenylhydrazine. The new compounds of this invention can be prepared in the same manner.

The following examples are illustrative of the process and products of the present invention but are not to be construed as limiting.

EXAMPLE 1

Preparation of Benzoyl Chloride (m-Trifluoromethylphenyl)hydrazone

Part A — Benzoic acid (m-trifluoromethylphenyl)hydrazide

A reaction mixture obtained by adding 35.2 g. (0.20 mole) m-trifluoromethylphenylhydrazine to a solution of 45.2 g. (0.20 mole) benzoic anhydride in 500 ml. benzene was heated at the reflux temperature for 2 hrs. After cooling the mixture to 25° C., the benzene was removed by evaporation under reduced pressure. The solid residue thus obtained was triturated in water made slightly alkaline with 50% aqueous sodium hydroxide. The thus washed solid residue was collected on a filter, washed with water, and recrystallized from 3-A ethanol. There was thus obtained 34.5 g. (62.0% yield) of benzoic acid (m-trifluoromethylphenyl)hydrazide having a melting point of 181° to 182° C.

Analysis:
Calc'd. for $C_{14}H_{11}F_3N_2O$:
C, 60.00; H, 3.96.
Found: C, 59.76; H, 4.23.

Part B

In order to obtain the desired benzoyl chloride compound, exactly 28.0 g. (0.1 mole) of the benzoic acid (m-trifluoromethylphenyl)hydrazide prepared in Part A above was added to a suspension consisting of 22.8 g. (0.11 mole) phosphorus pentachloride in 100 ml. carbon tetrachloride. The resulting suspension was heated at the reflux temperature until generation of gaseous hydrogen chloride ceased. The reaction mixture was then cooled to about 10° C. and a suspension consisting of 32.9 g. (0.35 mole) phenol in 60 ml. carbon tetrachloride was added slowly. There was further generation of gaseous hydrogen chloride, and when this reaction subsided, the carbon tetrachloride and other volatile components were removed by evaporation under reduced pressure at 30° C. The residual oil thus obtained was chromatographed over a column of silica gel using a solvent system consisting of 1 part technical hexane (a mixture of isomeric hexanes having a boiling range of 146° to 156° F.) and 1 part benzene. There was thus obtained a solid which upon recrystallization from Skellysolve F (pentanes) gave 18.5 g. (62.0% yield) of benzoyl chloride (m-trifluoromethylphenyl)-hydrazone having a melting point at 95° to 96.5° C.

Analysis:
Calc'd. for $C_{14}H_{10}ClF_3N_2$:
C, 56.29; H, 3.37; Cl, 11.87; N, 9.38.
Found: C, 56.55; H, 3,82; Cl, 11.90; N, 9.33.

EXAMPLE 2

Preparation of Benzoyl Chloride (2,4-Dichloro-5-trifluoromethylphenyl)hydrazone

Part A — Benzaldehyde (m-trifluoromethylphenyl)hydrazone

To a solution consisting of 15.9 g. (0.15 mole) benzaldehyde in 100 ml. methanol was added 26.4 g. (0.15 mole) m-trifluoromethylphenylhydrazine. After stirring the mixture for ½ hr. the methanol was removed by evaporation under reduced pressure. The solid residue thus obtained was recrystallized from technical hexane to give 30.0 g. (77.0% yield) of benzaldehyde (m-trifluoromethylphenyl)hydrazone having a melting point at 90° to 91° C.

Analysis:
Calc'd. for $C_{14}H_{11}F_3N_2$:
C, 63.63; H, 4.20.
Found: C, 63.84; H, 4.47.

Part B

In order to obtain the desired benzoyl chloride compound, a solution consisting of 13.2 g. (0.05 mole) of benzaldehyde (m-trifluoromethylphenyl)hydrazone prepared in Part A above dissolved in 150 ml. methylene dichloride was chilled to minus 40° C. (−40° c.) and 5.3 ml. (0.1 mole) chlorine was added. This reaction mixture was allowed to warm up to 25° C. and the methylene dichloride was removed by evaporation under reduced pressure. The solid residue thus obtained was chromatographed over a column of silica gel using technical hexane as the solvent. After removing the technical hexane by evaporation under reduced pressure there was obtained a solid residue. The solid was recrystallized from technical Skellysolve F to give 1.5 g. (12% yield) of benzoyl chloride (2,4-dichloro-5-trifluoromethylphenyl)hydrazone having a melting point at 85° to 86° C.

Analysis:
Calc'd. for $C_{14}H_9Cl_3F_3N_2$:
C, 45.74; H, 2.19; Cl, 28.94; N, 7.62.
Found: C, 45.71; H, 2.07; Cl, 29.27; N, 7.63.

EXAMPLE 3

Preparation of Benzoyl Chloride (2-Chloro-5-Trifluoromethylphenyl)hydrazone

Part A — Benzaldehyde (2-chloro-5-trifluoromethylphenyl)hydrazone

A solution consisting of 7.95 g. (0.075 mole) benzaldehyde, 150 ml. 95% aqueous ethanol, and 15.8 g. (0.075 mole) 2-chloro-5-trifluoromethylphenylhydrazine was heated to the boiling temperature in an open reaction vessel for a short time and then allowed to cool. Crystallization occurred and progressed so that 18.3 g. (82 per cent yield) of benzaldehyde (2-chloro-5-trifluoromethylphenyl)hydrazone having a melting point at 104° to 105° C. was recovered by filtration. An analytical sample, obtained by recrystallization from 95% ethanol, had the very same melting point.

Analysis:
Calc'd. for $C_{14}H_{10}ClF_3N_2$:
C, 56.29; H, 3.37.
Found: C, 56.58; H, 3.34.

Part B

In order to obtain the desired benzoyl chloride compound, exactly 10.45 g. (0.035 mole) benzaldehyde (2-chloro-5-trifluoromethylphenyl)hydrazone prepared in Part A, above was dissolved in 100 ml. methylene chloride, chilled to 0° C., and 2.0 ml. (0.0375 mole) chlorine was added to the cold solution. This reaction mixture was allowed to warm to 25° C., at which temperature the methylene chloride solvent was evaporated under reduced pressure. A solid residue was obtained. This solid was recrystallized once from technical hexane and two times from ethyl acetate to give 4.7 g. of benzoyl chloride (2-chloro-5-trifluoromethylphenyl)-hydrazone having a melting point of 147.5° to 149.0° C.

Analysis:
Calc'd. for $C_{14}H_9Cl_2F_3N_2$:
C, 50.47; H, 2.72; Cl, 21.29; N, 8.41.
Found: C, 50.15; H, 2.79; Cl, 21.50; N, 8.44.

EXAMPLE 4

Part A

Following the procedure of Example 1, Part A, but substituting separately
p-nitrobenzoic anhydride,
3,4-dichlorobenzoic anhydride,
p-chlorobenzoic anhydride,
m-chlorobenzoic anhydride,
o-chlorobenzoic anhydride,
p-toluic anhydride,
p-isopropylbenzoic anhydride,
2,4-dibromobenzoic anhydride,
m-toluic anhydride,
p-iodobenzoic anhydride,
3,5-dimethylbenzoic anhydride,
3-methyl-4-nitrobenzoic anhydride,
2,5-dimethylbenzoic anhydride,
2-chloro-4-nitrobenzoic anhydride,
pentafluorobenzoic anhydride,
p-bromobenzoic anhydride,
p-anisic anhydride,
p-ethoxybenzoic anhydride,
4-methoxy-2-nitrobenzoic anhydride,
2-bromo-4-methoxybenzoic anhydride,
3-methoxy-5-ethylbenzoic anhydride,
2,4,6-trichloro-m-toluic anhydride,
p-fluorobenzoic anhydride,
p-butoxybenzoic anhydride,
p-sec.butylbenzoic anhydride, and
5-chloro-2,3-dibromobenzoic anhydride for benzoic anhydride, there is prepared:
p-nitrobenzoic acid (m-trifluoromethylphenyl)-hydrazide,
3,4-dichlorobenzoic acid (m-trifluoromethylphenyl)-hydrazide,
p-chlorobenzoic acid (m-trifluoromethylphenyl)hydrazide,
m-chlorobenzoic acid (m-trifluoromethylphenyl)hydrazide,
o-chlorobenzoic acid (m-trifluoromethylphenyl)hydrazide,
p-toluic acid (m-trifluoromethylphenyl)hydrazide,
p-isopropylbenzoic acid (m-trifluoromethylphenyl)-hydrazide,
2,4-dibromobenzoic acid (m-trifluoromethylphenyl)-hydrazide,
m-toluic acid (m-trifluoromethylphenyl)hydrazide,
p-iodobenzoic acid (m-trifluoromethylphenyl)hydrazide,
3,5-dimethylbenzoic acid (m-trifluoromethylphenyl)-hydrazide,
3-methyl-4-nitrobenzoic acid (m-trifluoromethylphenyl)hydrazide,
2,5-dimethylbenzoic acid (m-trifluoromethylphenyl)-hydrazide,
2-chloro-4-nitrobenzoic acid (m-trifluoromethylphenyl)-hydrazide,
pentafluorobenzoic acid (m-trifluoromethylphenyl)-hydrazide,
p-bromobenzoic acid (m-trifluoromethylphenyl)hydrazide,
p-anisic acid (m-trifluoromethylphenyl)hydrazide,
p-ethoxybenzoic acid (m-trifluoromethylphenyl)-hydrazide,
4-methoxy-2-nitrobenzoic acid (m-trifluoromethylphenyl)hydrazide,
2-bromo-4-methoxybenzoic acid (m-trifluoromethylphenyl)hydrazide,
3-methoxy-5-ethylbenzoic acid (m-trifluoromethylphenyl)hydrazide,
2,4,6-trichloro-m-toluic acid (m-trifluoromethylphenyl)hydrazide,
p-fluorobenzoic acid (m-trifluoromethylphenyl)-hydrazide,
p-butoxybenzoic acid (m-trifluoromethylphenyl)-hydrazide,
p-sec.butylbenzoic acid (m-trifluoromethylphenyl)-hydrazide, and 5-chloro-2,3-dibromobenzoic acid (m-trifluoromethylphenyl)hydrazide, respectively.

Part B

Following the procedure of Example 1, Part B, but substituting separately,
p-nitrobenzoic acid (m-trifluoromethylphenyl)hydrazide,
3,4-dichlorobenzoic acid (m-trifluoromethylphenyl)hydrazide,
p-chlorobenzoic acid (m-trifluoromethylphenyl)hydrazide,
m-chlorobenzoic acid (m-trifluoromethylphenyl)hydrazide,
o-chlorobenzoic acid (m-trifluoromethylphenyl)hydrazide,
p-toluic acid (m-trifluoromethylphenyl)hydrazide,
p-isopropylbenzoic acid (m-trifluoromethylphenyl)hydrazide,
2,4-dibromobenzoic acid (m-trifluoromethylphenyl)hydrazide,
m-toluic acid (m-trifluoromethylphenyl)hydrazide,
p-iodobenzoic acid (m-trifluoromethylphenyl)hydrazide,
3,5-dimethylbenzoic acid (m-trifluoromethylphenyl)-hydrazide,
3-methyl-4-nitrobenzoic acid (m-trifluoromethylphenyl)hydrazide,
2,5-dimethylbenzoic acid (m-trifluoromethylphenyl)-hydrazide,
2-chloro-4-nitrobenzoic acid (m-trifluoromethylphenyl)-hydrazide,
pentafluorobenzoic acid (m-trifluoromethylphenyl)-hydrazide,
p-bromobenzoic acid (m-trifluoromethylphenyl)hydrazide,
p-anisic acid (m-trifluoromethylphenyl)hydrazide,
p-ethoxybenzoic acid (m-trifluoromethylphenyl)hydrazide,
4-methoxy-2-nitrobenzoic acid (m-trifluoromethylphenyl)hydrazide,
2-bromo-4-methoxybenzoic acid (m-trifluoromethylphenyl)hydrazide,
3-methoxy-5-ethylbenzoic acid (m-trifluoromethylphenyl)hydrazide,
2,4,6-trichloro-m-toluic acid (m-trifluoromethylphenyl)hydrazide,
p-fluorobenzoic acid (m-trifluoromethylphenyl)hydrazide,
p-butoxybenzoic acid (m-trifluoromethylphenyl)hydrazide,
p-sec.butylbenzoic acid (m-trifluoromethylphenyl)hydrazide, and
5-chloro-2,3-dibromobenzoic acid (m-trifluoromethylphenyl)hydrazide for benzoic acid (m-trifluoromethylphenyl)hydrazide, there is prepared:
p-nitrobenzoyl chloride (m-trifluoromethylphenyl)-hydrazone,
3,4-dichlorobenzoyl chloride (m-trifluoromethylphenyl)hydrazone,
p-chlorobenzoyl chloride (m-trifluoromethylphenyl)-hydrazone,
m-chlorobenzoyl chloride (m-trifluoromethylphenyl)-hydrazone,
o-chlorobenzoyl chloride (m-trifluoromethylphenyl)-hydrazone,
p-toluoyl chloride (m-trifluoromethylphenyl)hydrazone,
p-isopropylbenzoyl chloride (m-trifluoromethylphenyl)hydrazone,
2,4-dibromobenzoyl chloride (m-trifluoromethylphenyl)-hydrazone,
m-toluoyl chloride (m-trifluoromethylphenyl)hydrazone,
p-iodobenzoyl chloride (m-trifluoromethylphenyl)-hydrazone,
3,5-dimethylbenzoyl chloride (m-trifluoromethylphenyl)hydrazone,
3-methyl-4-nitrobenzoyl chloride (m-trifluoromethylphenyl)hydrazone,
2,5-dimethylbenzoyl chloride (m-trifluoromethylphenyl)hydrazone,
2-chloro-4-nitrobenzoyl chloride (m-trifluoromethylphenyl)hydrazone,
pentafluorobenzoyl chloride (m-trifluoromethylphenyl)-hydrazone,
p-bromobenzoyl chloride (m-trifluoromethylphenyl)-hydrazone,
p-anisoyl chloride (m-trifluoromethylphenyl)hydrazone,
p-ethoxybenzoyl chloride (m-trifluoromethylphenyl)-hydrazone,
4-methoxy-2-nitrobenzoyl chloride (m-trifluoromethylphenyl)hydrazone,
2-bromo-4-methoxybenzoyl chloride (m-trifluoromethylphenyl)hydrazone,
3-methoxy-5-ethylbenzoyl chloride (m-trifluoromethylphenyl)hydrazone,
2,4,6-trichloro-m-toluoyl chloride (m-trifluoromethylphenyl)hydrazone,
p-fluorobenzoyl chloride (m-trifluoromethylphenyl)-hydrazone,
p-butoxybenzoyl chloride (m-trifluoromethylphenyl)-hydrazone,
p-sec.butylbenzoyl chloride (m-trifluoromethylphenyl)hydrazone, and
5-chloro-2,3-dibromobenzoyl chloride (m-trifluoromethylphenyl)hydrazone, respectively.

EXAMPLE 5

Part A

Following the procedure of Example 2, Part A, but substituting separately p-trifluoromethylphenylhydrazine, o-trifluoromethylphenylhydrazine, m-(α,α-difluoroethyl)-phenylhydrazine, m-(α,α-difluoropropyl)phenylhydrazine, and 3,5-di(trifluoromethyl)phenylhydrazine for m-trifluoromethylphenylhydrazine, there is prepared the corresponding benzaldehyde (p-trifluoromethylphenyl)hydrazone, benzaldehyde (o-trifluoromethylphenyl)hydrazone, benzaldehyde [m-(α,α-difluoroethyl)phenyl]hydrazone, benzaldehyde [m-(α,α-difluoropropyl)phenyl]hydrazone, and benzaldehyde [3,5-di(trifluoromethyl)phenyl]hydrazone, respectively.

Part B

Following the procedure of Example 2, Part B, but substituting separately benzaldehyde (p-trifluoromethylphenyl)hydrazone, benzaldehyde (o-trifluoromethylphenyl)-hydrazone, benzaldehyde [m-(α,α-difluoroethyl)phenyl]-hydrazone, benzaldehyde [m-(α,α-difluoropropyl)phenyl]-hydrazone, and benzaldehyde [3,5-di(trifluoromethyl)-phenyl]hydrazone for benzaldehyde (3-trifluoromethylphenyl)hydrazone, there is prepared the corresponding benzoyl chloride (2,6-dichloro-4-trifluoromethylphenyl)-hydrazone, benzoyl chloride (4,6-dichloro-2-trifluoromethylphenyl)hydrazone, benzoyl chloride [2,4-dichloro-5-($\alpha,\alpha$-difluoroethyl)phenyl]hydrazone, benzoyl chloride [2,4-dichloro-5-($\alpha,\alpha$-difluoropropyl)phenyl]hydrazone, and benzoyl chloride [3,5-di(trifluoromethyl)phenyl]-hydrazone, respectively.

EXAMPLE 6

Following the procedure of Example 2, Part A, but substituting p-methylbenzaldehyde, p-ethylbenzaldehyde, p-isopropylbenzaldehyde and p-butylbenzaldehyde for benzaldehyde, there is prepared:

p-toluoylaldehyde (m-trifluoromethylphenyl)hydrazone, p-ethylbenzaldehyde (m-trifluoromethylphenyl)-hydrazone, p-isopropylbenzaldehyde (m-trifluoromethylphenyl)-hydrazone, and p-butylbenzaldehyde (m-trifluoromethylphenyl)-hydrazone, respectively.

In the Formulas I, II, and III, above, the substituent group "$\alpha$-$F_n$alkyl" is an alkyl group of from 1 to 3 carbon atoms, inclusive, having carbon atoms substituted with fluorine atoms. More particularly, the substituent group is advantageously trifluoromethyl $\alpha,\alpha$-difluoroethyl, and $\alpha,\alpha$-difluoropropyl.

The new arthropocidal and otherwise biologically active benzoyl chloride ($\alpha$-$F_n$alkylphenyl)hydrazones of Formula I can be utilized as the pure compounds, such as those described in the Examples, as technical grade compounds from commercial production, or as mixtures of individual pure compounds; but for practical reasons, the compounds are preferably formulated with a diluent carrier with or without adjuvants for use against arthropod pests. There are many different kinds of diluent carriers suitable for the method and formulation embodiments of this invention. Dispersible carriers are commonly used in the art. Such carriers may or may not include adjuvants such as wetting agents, emulsifying agents, stickers, and other components that indirectly promote efficacy.

For example, pesticidal formulations useful against arthropod pests which become epidemic or ubiquitous can be formulated as dusts, wettable powders, emulsifiable concentrates, aqueous dispersions, solutions, and flowable creams for application to a situs, animals, and foliage, seeds or other parts of plants. Granular formulations can be prepared and applied to soil or on other appropriate surfaces. Moreover, the new benzoyl chloride ($\alpha$-$F_n$alkylphenyl)hydrazones of the invention can be the sole active agent in a formulation or other insecticidal, miticidal, fungicidal, virucidal, or bactericidal components may be included.

The new benzoyl chloride ($\alpha$-$F_n$alkylphenyl)hydrazones can be readily formulated as dusts by grinding a mixture of the compound and a pulverulent carrier in the presence of each other. Grinding is conveniently accomplished in a ball mill, a hammermill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to animals, inanimate matter, fruit trees, crop plants, and soil so as to effect thorough distribution and coverage. Dusts are particularly adapted for effectively controlling insects and mites over wide areas when applied by airplane. They are also indicated for application to the undersides of plant foliage and to the skin of poultry and hairy animals.

Representative suitable pulverulent carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, sulfur, silica and silicates; chemically modified minerals such as washed bentonite, and colloidal silica; and organic flours such as wood, walnut shell, soybean, cottonseed, and tobacco flours, and free-flowing, hydrophobic starches.

Dusts can also be prepared by dissolving a benzoyl chloride ($\alpha$-$F_n$alkylphenyl)hydrazone in a volatile solvent such as methylene chloride, mixing the solution with a pulverulent carrier and evaporating the solvent.

The proportions of pulverulent carrier and benzoyl chloride ($\alpha$-$F_n$alkylphenyl)hydrazone can vary over a wide range depending upon the arthropod pests to be controlled and the conditions of treatment. In general, dust formulations can contain up to about 90% (on a weight basis) of the active ingredient. Dusts having as little as 0.001% of the active ingredient can be used, but a generally preferred proportion is from about 0.50% to about 20% of active ingredient.

The dispersible powder formulations of this invention are prepared by incorporating a surfactant in a dust formulation prepared as described above. When about 0.1% to about 12% of a surfactant is incorporated in a dust, the dispersible powder thus obtained is particularly adapted for further admixture with water for spraying on inanimate matter and products, fruit trees, field crops, soil, and livestock. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10% to about 80% of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H–77), blends of polyoxyethylene ethers and oil-soluble sulfonates (Emcol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder formulations can be prepared with a mixture of surfactants of the types indicated if desired.

A suitable dispersible powder formulation is obtained by blending and milling 327 lbs. of Georgia Clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

| | |
|---|---|
| Active ingredient | 25% |
| Isooctylphenoxy polyethoxy ethanol | 1% |
| Polymerized sodium salt of substituted benzoid long-chain sulfonic acid | 2% |
| Georgia Clay | 72% |

This formulation, when dispersed in water at the rate of 10 lbs. per 100 gals., gives a spray formulation containing about 0.3% (3000 ppm) active ingredient which can be applied to insects, spiders, ticks, or mites, plants or other arthropod habitats, or to their foods for control of various arthropod pests.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and anti-foaming agents such as stearic acid can also be included.

The new anti-arthropodal benzoyl chloride (60-$F_n$alkylphenyl)hydrazones of this invention can be applied to insects, spiders, ticks, mites, objects, or situs in aqueous sprays without a solid carrier. Since, however, the compounds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in the water and any excess benzoyl chloride ($\alpha$-$F_n$alkylphenyl)hydrazone will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which benzoyl chloride ($\alpha$-$F_n$alkylphenyl)hydrazones are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for applying to insects and mites.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5% to about 50% by weight, preferably from about 10% to about 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 ppm (parts per million) of active ingredient. In the same manner, more concentrated solution of active ingredient can be prepared.

The concentrate formulations of the invention which are intended for use in the form of aqueous dispersions of emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The granular formulations of this invention are convenient for application to soil when persistence is desired. Granulars are readily applied broadcast or by localized, e.g., in-the-row appliations. The individual granules may be desired size from 10 to 60 mesh, advantageously 20 to 40 mesh. Granulars are prepared by dissolving the active compound in a solvent such as methylene chloride, xylene, or acetone and applying the solution to a quantity of a granulated absorbent carrier. Representative granulated absorbent carriers include ground corn cobs, ground walnut shells, ground peanut hulls, and the like. If desired, the impregnated granulated absorbent carrier can be coated with a coating that will preserve the integrity of the granular until it is applied to an object or situs favorable for release of the active ingredient.

The rates of application to insects, spiders, ticks, mites, objects, or situs will depend upon the species of antrhopod to be controlled, the presence or absence of desirable living organisms, temperature conditions of treatment, and the method and efficiency of application. In general, arthropocidal activity is obtained when the compounds are applied at concentrations of about 10 to about 6000 ppm, preferably at concentrations of about 30 to about 4000 ppm.

The formulations containing new benzoyl chloride (α-F$_n$alkylphenyl)hydrazones according to the invention can be applied to insects, mites, ticks, spiders, objects or situs by conventional methods. For example, an area of soil, a building, animals, or plants can be treated by spraying wettable powder suspensions, emulsions, or solutions from powder sprayers or from hand-operated knapsack sprayers. Dips can be used for livestock. Dusts can be applied by power dusters, or by hand-operated dusters. Creams and ointment formulations can be applied to skin or objects for prolonged protection from insects, spiders, ticks, or mites.

The active compounds of the invention can also be formulated in relatively dilute proportions in a dispersible insecticide carrier for household applications. Thus, the active compounds can be formulated in dusts having from about 0.1% to 5.0% active ingredient with a dusting powder as hereinbefore described, and in solutions containing from about 0.01% to about 5.0% active ingredient with deodorized kerosene for aerosol applications.

It will of course be appreciated that the conditions encountered when applying the method and formulations of this invention to actual practice can vary widely. Included among the variables that may be encountered are the degree of infestation by pests, the particular pest to be controlled, the particular situs being treated, the age or degree of development of animals or plants, the prevailing weather conditions, such as temperature, relative humidity, rainfall, dews, and so forth.

The compounds of Formula I are effective pesticides that can be used to control invertebrate pests in agriculture, in industry, and around the room. The compounds have been found to be active against invertebrate animals of the Phylum Arthropoda, illustratively Class Insecta, for example, order Coleoptera, more specifically, the cotton boll weevil (*Anthonomus grandis* Boheman), the confused flour beetle (*Tribolium confusum* Jacquelin de Val), and the Mexican bean beetle (*Epilachna varivestis* Mulsant), order Diptera, more specifically, the housefly (*Musca domestica* Linnaeus), order Orthoptera, more specifically, the house cricket (*Acheta domesticus* Linnaeus), and the German cockroach (*Blatella germanica* Linnaeus), and order Lepidoptera, more specifically, the Southern armyworm (*Prodenia eridania* Cramer), and Class Arachnida, for example, order Acarina, more specifically, the two-spotted spider mite (*Tetranychus urticae* Koch).

Efficacy against invertebrate pests has been demonstrated at concentrations of 1000, 500, 100, 50 and even 10 ppm depending upon the specific insect or mite used. Some invertebrate animal pests will be more sensitive to the compounds than others, and others might be quite resistant. In general, the compounds of Formula I are used at concentrations ranging from about 30 to about 6000 ppm.

The compounds of this invention, more particularly benzoyl chloride (m-trifluoromethylphenyl)hydrazone, benzoyl chloride (2,4-dichloro-5-trifluoromethylphenyl)-hydrazone, and benzoyl chloride (2-chloro-5-trifluoromethyphenyl)hydrazone are contemplated to be active against parasitic worms in animals. Some representative susceptible worms are suggested to be nematodes and cestodes particularly, e.g., *Nematospiroides dubious* and *Syphacia obvelata*.

I claim:

1. The method for controlling arthropod pests which is characterized by contacting the pests with an effective, anti-arthropodal amount of a benzoyl chloride (α-F$_n$alkylphenyl)hydrazone having the structural formula:

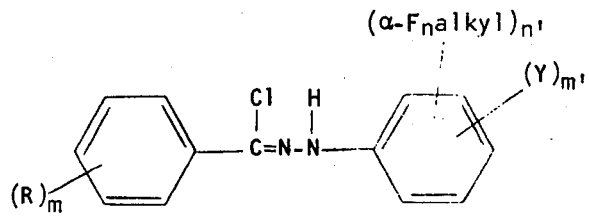

wherein the characterizing substituent group "α-F$_n$alkyl" is a fluorine substituted lower-alkyl group of from 1 to 3 carbon atoms, inclusive, having at least one F atom on the α-carbon and up to a total of 4 fluorine atoms, $n$ being therefore an integer 1 to 4, inclusive; R and Y are halogen, lower alkyl of from 1 to 4 carbon atoms, inclusive, lower-alkoxy of from 1 to 4 carbon atoms, inclusive, or nitro; $m$ is an integer 0 to 5, inclusive; $m'$ is an integer 0 to 2, inclusive, $n'$ is an integer 1 or 2; the sum of $m + m' + n'$ being not more than 6, the sum of $n' + m'$ being not more than 3, the sum of the carbon atoms in the alkyl substituents being not more than 15, and there being no more than one nitro group in the molecule.

2. The method according to claim 1 wherein $n'$ is one.

3. The method according to claim 2 wherein the α-F$_n$alkyl group is trifluoromethyl.

4. The method according to claim 3 wherein the trifluoromethyl group is in the meta-position.

5. The method according to claim 4 wherein $m$ is 0.

6. The method according to claim 5 where the hydrazone compound is benzoyl chloride (m-trifluoromethylphenyl)hydrazone.

7. The method according to claim 5 wherein $m'$ is other than 0, and Y is halogen.

8. The method according to claim 7 where the hydrazone compound is benzoyl chloride (2,4-dichloro-5-trifluoromethylphenyl)hydrazone.

9. The method according to claim 7 where the hydrazone compound is benzoyl chloride (2-chloro-5-trifluoromethylphenyl)hydrazone.

10. An anti-arthropodal formulation comprising a dispersible carrier selected from the group consisting of a finely divided pulverulent carrier and an inert organic liquid carrier and an effective anti-arthropodal concentration of a benzoyl chloride (α-F$_n$alkylphenyl hydrazone having the sturctural formula:

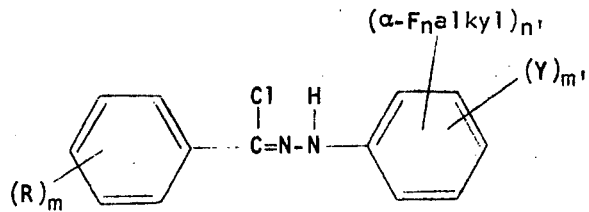

wherein the characterizing substituent group "α-F$_n$alkyl" is a fluorine substituted lower-alkyl group of from 1 to 3 carbon atoms, inclusive, having at least one F atom on the $\alpha$-carbon and up to a total of 4 fluorine atoms, $n$ being therefore an integer 1 to 4, inclusive; R and Y are halogen, lower-alkyl of from 1 to 4 carbon atoms, inclusive, lower-alkoxy of from 1 to 4 carbon atoms, inclusive, or nitro; $m$ is an integer 0 to 5, inclusive; $m'$ is an integer 0 to 2, inclusive; $n'$ is an integer 1 or 2; the sum of $m + m' + n'$ being not more than 6, the sum of $n' + m'$ being not more than 3, the sum of the carbon atoms in the alkyl substituents being not more than 15, and there being no more than one nitro group in the molecule.

11. The formulation according to claim 10 wherein $n'$ is one.

12. The formulation according to claim 11 wherein the $\alpha$-$F_n$alkyl group is trifluoromethyl.

13. The formulation according to claim 12 wherein the trifluoromethyl group is in the meta-position.

14. The formulation according to claim 13 wherein $m$ is 0.

15. The formulation according to claim 14 where the hydrazone compound is benzoyl chloride (m-trifluoromethylphenyl)hydrazone.

16. The formulation according to claim 14 wherein $m'$ is other than 0, and Y is halogen.

17. The formulation according to claim 16 where the hydrazone compound is benzoyl chloride (2,4-dichloro-5-trifluoromethylphenyl)hydrazone.

18. The formulation according to claim 16 where the hydrazone compound is benzoyl chloride (2-chloro-5-trifluoromethylphenyl)hydrazone.

19. The formulation according to claim 10 wherein a surface active agent is included in order to promote dispersion and spreading.

20. The formulation according to claim 19 wherein the dispersible carrier is a finely divided pulverulent solid.

21. The fomulation according to claim 19 wherein the dispersible carrier is liquid.

22. The formulation according to claim 21 wherein the formulation also comprises water.

* * * * *